(12) United States Patent
Ma et al.

(10) Patent No.: US 10,849,348 B2
(45) Date of Patent: Dec. 1, 2020

(54) SUCROSE MONOESTERS MICROEMULSIONS

(71) Applicant: Firmenich SA, Geneva (CH)

(72) Inventors: Ling Ma, Plainsboro, NJ (US); Valery Normand, Plainsboro, NJ (US); Ronald H. Skiff, Plainsboro, NJ (US); Ernst L. Steinboeck, Geneva (CH)

(73) Assignee: Firmenich SA, Satigny (CH)

( * ) Notice: Subject to any disclaimer, the term of this patent is extended or adjusted under 35 U.S.C. 154(b) by 171 days.

(21) Appl. No.: 15/759,253

(22) PCT Filed: Sep. 21, 2016

(86) PCT No.: PCT/EP2016/072430
§ 371 (c)(1),
(2) Date: Mar. 12, 2018

(87) PCT Pub. No.: WO2017/050827
PCT Pub. Date: Mar. 30, 2017

(65) Prior Publication Data
US 2018/0249747 A1    Sep. 6, 2018

Related U.S. Application Data

(60) Provisional application No. 62/221,166, filed on Sep. 21, 2015.

(51) Int. Cl.
*A23L 27/00* (2016.01)
*A23L 2/52* (2006.01)
*A23L 29/10* (2016.01)

(52) U.S. Cl.
CPC .............. *A23L 27/80* (2016.08); *A23L 2/52* (2013.01); *A23L 29/10* (2016.08); *A23V 2002/00* (2013.01)

(58) Field of Classification Search
CPC ............ A23L 27/80; A23L 29/10; A23L 2/52
(Continued)

(56) References Cited

U.S. PATENT DOCUMENTS 4,835,002 A * 5/1989 Wolf et al.
2010/0323066 A1  12/2010 Comstock
2014/0147569 A1  5/2014 Pulsen et al.

FOREIGN PATENT DOCUMENTS

EP    1243185 A2   9/2002
EP    2359698 A1   8/2011
(Continued)

OTHER PUBLICATIONS

International Search Report and Written Opinion for international application No. PCT/EP2016/072430, dated Sep. 9, 2016.

*Primary Examiner* — Helen F Heggestad
(74) *Attorney, Agent, or Firm* — Armstrong Teasdale LLP

(57) ABSTRACT

An oil in water (o/w) micro-emulsion comprising:
a. water;
b. from about 3% up to about 30% oil;
c. from about 0.1% up to about 10% lecithin;
d. sucrose monoester as an emulsifier wherein the ratio of the combined amount of a lecithin and sucrose monoester to oil is less than 1;
e. propylene glycol wherein the propylene glycol to water ratio by weight is greater than 1; and
f. from about 14% up to about 40%, by weight, a sugar selected from the group consisting of fructose, glucose, and sucrose, and combinations thereof; wherein the mean droplet size of the o/w micro-emulsion is about 10 to about 80 nm.

14 Claims, 3 Drawing Sheets

(58) Field of Classification Search
USPC .................. 426/590, 601, 602, 519, 611
See application file for complete search history.

(56) References Cited

FOREIGN PATENT DOCUMENTS

| | | | |
|---|---|---|---|
| WO | 2007026271 | A1 | 3/2007 |
| WO | 2009/078245 | * | 6/2009 |
| WO | 2009078245 | A1 | 6/2009 |

* cited by examiner

SUCROSE MONOESTERS MICROEMULSIONS

RELATED APPLICATIONS

This application is a national stage application under 35 U.S.C. § 371 filing of International Patent Application PCT/EP2016/072430, filed Sep. 21, 2016, which claims the benefit of U.S. Provisional Patent Application Ser. No. 62/221,166, filed Sep. 21, 2015. The contents of which are incorporated herein by reference in their entirety.

FIELD

The field relates to oil in water (o/w) micro-emulsions used to provide for a stable clear aqueous foods or clear beverages.

BACKGROUND

Clear emulsions are used as flavor, color, antimicrobial, micronutrient, and nutraceutical delivery systems for applications in beverages such as fortified water, soft drinks, etc. and in aqueous-based food such as sauces and dips, etc., when transparency is needed. Micro-emulsions possess more attractive advantages over nano and macroemulsions due to their much simpler and lower energy input for preparation and their thermodynamic stability. However, a limited number of food-grade surfactants are available for making micro-emulsion preparations due to regulatory, economic and sensory issues. Among the ones that are available sugar esters have drawn great attention due to their advantages such as being Generally Recognized as Safe (GRAS) status, and some are have odorless and tasteless properties.

To make dilutable oil in water (o/w) micro-emulsions using food-grade, non-ionic emulsifier(s), it usually requires large amounts of emulsifiers for example where the surfactant to oil ratio has to be greater than 1 (SOR>1).

SUMMARY

Provided herein is an oil in water (o/w) micro-emulsion comprising:
a. water;
b. from about 3% up to about 30% oil;
c. from about 0.1% up to about 10% of a lecithin;
d. a sucrose monoester wherein the ratio of the combined amount of the lecithin and the sugar ester to oil is less than 1;
e. propylene glycol wherein the propylene glycol to water ratio by weight is greater than 1:1; and
f. from about 14%, more particularly about 17%% up to about 40%, by weight, a sugar selected from the group consisting of fructose, glucose, and sucrose, and combinations thereof; wherein the mean droplet size of the o/w micro-emulsion is about 10 to about 80 nm.

Further provided herein is a process for making an oil/water (o/w) emulsion comprising:
a. mixing a sucrose monoester into propylene glycol at temperature of about 40° C. up to about 70° C. to form a sucrose monoester solution;
b. mixing water, sugar into the sucrose monoester solution;
c. dissolving a lecithin into an oil to form an oil phase wherein the ratio of the combined amount of the sucrose monoester and the lecithin to oil is from 0.3:to less than 1; and
d. mixing the oil phase into the sucrose monoester solution to form a clear micro-emulsion wherein the microemulsion is formed in the absence of an homogenization step.

DETAILED DESCRIPTION

Figure 1:
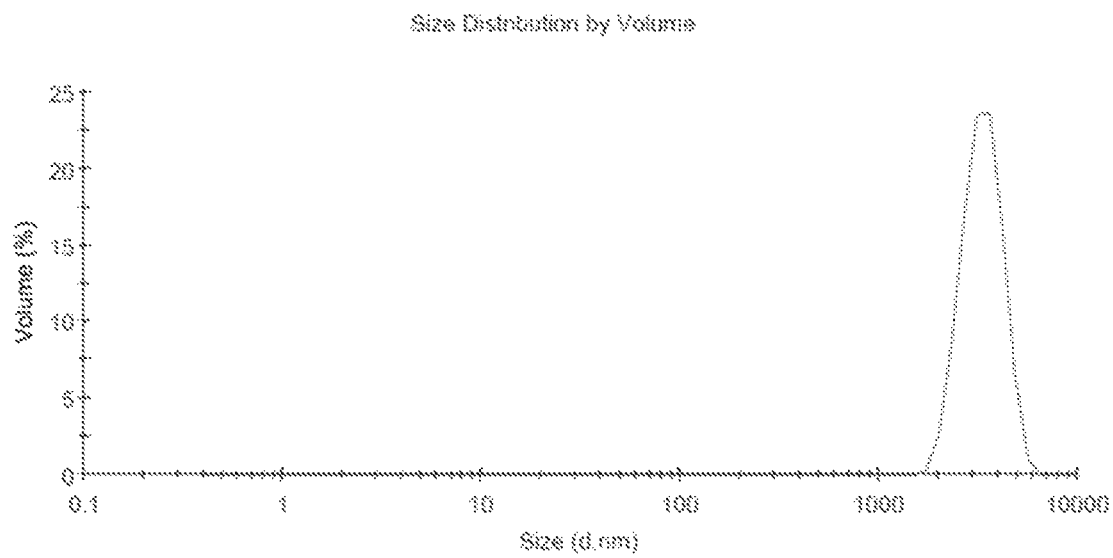
FIG. 1. Shows a Dynamic Light Scattering (DLS) measurement of droplet size showing a very large droplet size (>1 μm) of the emulsion at room temperature.

For the descriptions herein and the appended claims, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

In one embodiment the emulsion comprises, based on the total weight of the emulsion, from about 3% up to about 7% by weight oil, more particularly about 5% by weight oil. In a further embodiment the emulsion comprises, based on the total weight of the emulsion, from about 15% up to about 25% by weight oil, more particularly about 20% by weight oil.

In one embodiment the emulsion comprises, based on the total weight of the emulsion, about 0.2% up to about 0.6% by weight of a lecithin, more particularly about 0.4% by weight of a lecithin. In one embodiment the emulsion comprises, based on the total weight of the emulsion, from about 0.5% up to about 2.5%, more particularly about 3%3%, by weight, a lecithin, more particularly about 1.5% by weight a lecithin.

In one embodiment provided herein the ratio of the combined amount, by weight, of a lecithin and a sucrose monoester to flavor oil is less than 1, particularly from 0.3:1 to about 0.3 to less than 1, more particularly from 0.3:2.9 to about 0.3:1.9, even more particularly from about 0.5 to about 1:2.5, even more particularly about 1:2. In one embodiment, the sucrose monoester is selected from the group consisting of sucrose laurate, sucrose myristate, sucrose oleate, and sucrose palmitate. In one embodiment, the sucrose monoester is sucrose palmitate.

In one embodiment the lecithin is selected from the group consisting of lecithin, hydroxylated lecithin and lysolecithin.

In one embodiment, an emulsion provided herein comprises, based on the total weight of the emulsion from about 0.1% up to about 20% by weight glycerin. In one embodiment the emulsion comprises, based on the total weight of the emulsion, from about 8%, more particularly about 9% up to about 12%, more particularly about 14% by weight glycerin, more particularly about 2.5%, more particularly about 10%12.5% by weight glycerin. In a further embodiment, the emulsion comprises from about 15% up to about 17% glycerin, more particularly about 16% glycerin by weight of the total weight of the emulsion.

In one embodiment, an emulsion provided herein comprises from about 0.1% up to about 20% glycerin, particularly from about 10% up to about 20% glycerin by weight of the total weight of the emulsion.

In one embodiment, an emulsion provided herein comprises from about 0.08% up to about 1%, by weight, of the total weight of the emulsion, a $C_{2-6}$ soluble alcohol, particularly about 0.1-0.5% of a soluble $C_{2-6}$ alcohol.

In one embodiment, the alcohol is selected from the group consisting of ethanol, propanol, butanol, pentanol, and hexanol, particularly butanol.

In a particular embodiment, the butanol is selected from the group consisting of n-butanol, sec-butanol, isobutanol and tert butanol.

In a particular embodiment the propanol is selected from the group consisting of 1-propanol and isopropyl alcohol.

In a particular embodiment the alcohol is ethanol.

In one embodiment, an emulsion provided herein has an average droplet size of from about 10 nm to about 80 nm, more particularly from about 10 nm to about 50 nm.

In a further embodiment, an emulsion provided herein is provided in the substantial absence of sucrose, more particularly less than about 18%, more particularly less than 1%, even more particular less than 0.5% and even more particular less than 0.1% sucrose, by weight, of the total weight of the emulsion.

In a further embodiment, the emulsion has a turbidity of about less than about 25 Nephelometric Turbidity Units (NTU). Particularly from about 1 NTU to about 14 NTU.

Further provided herein is a food or beverage comprising from about 0.002% to about 0.1%, by weight, of the emulsion.

Further provided herein is a process for making an oil/water (o/w) emulsion comprising:

a. mixing a sucrose monoester into propylene glycol at temperature of about 40° C. up to about 70° C. to form a sucrose monoester solution;

b. mixing water, sugar into the sucrose monoester solution;

c. dissolving a lecithin into an oil to form an oil phase wherein the ratio of the combined amount of the sucrose monoester and the lecithin to oil is less than 1; and d. mixing the oil phase into the sucrose monoester solution to form a clear micro-emulsion by simple mixing.

In particular embodiments, emulsions provided herein comprise the ingredients listed in the Table A.

TABLE A

| Ingredients | Lemon w/w % | Lemon w/w % | Lime w/w % | Lime w/w % | Orange w/w % | Tangerine w/w % | Grapefruit w/w % |
|---|---|---|---|---|---|---|---|
| H2O | 16.7 | 17 | 16.4 | 13.5 | 17 | 13.5 | 10.7 |
| PG | 22.5 | 22.5 | 25 | 20 | 22.5 | 25 | 25 |
| Glu-H2O | | | | | | | |
| Fructose | 17 | 17 | 17 | 17 | 17 | 17 | 32.3 |
| SMP | 9 | 9 | 10 | 15 | 9 | 10 | 10 |
| Glycerol | 12.5 | 12.5 | 10 | 12.5 | 12.5 | 12.5 | |
| Flavor Oil | 20 | 20 | 20 | 20 | 20 | 20 | 20 |
| PC100 | 1.2 | 1.5 | 1.1 | 1.5 | 1.5 | 1.5 | 1.5 |
| PC25 | 0.6 | | | | | | |
| butanol | 0.5 | 0.5 | 0.5 | 0.5 | 0.5 | 0.5 | 0.5 |
| | 100 | 100 | 100 | 100 | 100 | 100 | 100 |

In a particular embodiment, a micro-emulsion is provided having the ingredients and their amounts as listed in Table B.

TABLE B

| Ingredient | w/w % |
|---|---|
| H2O | 13.72 |
| Fructose | 41.2 |
| PG | 23.52 |
| SMP P90 | 1.48 |
| Glycerol | 16.3 |
| flavor oil | 3.4 |
| PC 100 | 0.25 |
| BuOH | 0.13 |

In a further embodiment provided herein is an oil-in-water (o/w) micro-emulsion comprising:

a. About 16.7% by weight of the total weight of the emulsion, water;

b. about 20% by weight of the total weight of the emulsion, oil;

c. about 1.5% to about 1.8%, by weight of the total weight of the emulsion, of a lecithin;

d. about 9% to 15%, by weight of the total weight of the emulsion, a sucrose monoester as an emulsifier;

e. about 20 to 25%, by weigh of the total weight of the emulsion, propylene glycol, f. 17%, by weight of the total weight of the emulsion, fructose;

g. About 10% to about 12.5%, by weight of the total weight of the emulsion, glycerin;

h. about 0.5%, by weight of the total weight of the emulsion, butanol and wherein the mean droplet size of the o/w micro-emulsion is about 10 to about 80 nm.

An unexpected aspect of the process and resulting product provided herein is that a micro-emulsion can be obtained without the need with a high shear force at any stage of the process. Hence, the process provided herein may be provided in the substantial absence of a high shear force. Further, the emulsion formed does not need to undergo homogenization to achieve a clear micro-emulsion particularly those having an average droplet size of from about 10 nm to about 80 nm, more particularly from about 10 nm to about 50 nm.

The compositions and methods provided herein have use in aqueous food or beverage products. The types of end products where this invention is useful are: flavored waters, soft drinks, diet drinks, alcoholic drinks, sport and nutraceutical drink preparations, medicinal drink formulations, beverage supplements, sauces, dressings, or dips when transparency is required.

Beverage products that may include the oil in water emulsion described herein include, without limitation, carbonated soft drinks, including cola, lemon-lime, root beer, heavy citrus ("dew type"), fruit flavored and cream sodas; powdered soft drinks, as well as liquid concentrates such as fountain syrups and cordials; coffee and coffee-based drinks, coffee substitutes and cereal-based beverages; teas, including dry mix products as well as ready-to-drink teas (herbal and tealeaf based); fruit and vegetable juices and juice flavored beverages as well as juice drinks, nectars, concentrates, punches and "ades"; sweetened and flavored waters, both carbonated and still; sport/energy/health drinks; alcoholic beverages plus alcohol-free and other low-alcohol products including beer and malt beverages, cider, and wines (still, sparkling, fortified wines and wine coolers); other beverages processed with heating (infusions, pasteurization, ultra high temperature, ohmic heating or commercial aseptic sterilization) and hot-filled packaging; and cold-filled products made through filtration or other preservation technique In one embodiment, the oil is a flavor. Particular ingredients provided herein are flavors or flavor compositions. By "flavor or flavoring composition," it is meant here a flavoring ingredient or a mixture of flavoring ingredients, solvents or adjuvants used or the preparation of a flavoring formulation, i.e. a particular mixture of ingredients which is intended to be added to an edible composition (including but not limited to a beverage) or chewable product to impart, improve or modify its organoleptic properties, in particular its flavor and/or taste. Flavoring ingredients are well known to a person skilled in the art and their nature does not warrant a detailed description here, which in any case would not be exhaustive, the skilled flavorist being able to select them on the basis of his or her general knowledge and according to the intended use or application and the organoleptic effect it is desired to achieve. Many of these flavoring ingredients are listed in reference texts such as in the book by S. Arctander, Perfume and Flavor Chemicals, 1969, Montclair, N.J., USA, or its more recent versions, or in other works of similar nature such as Fenaroli's Handbook of Flavor Ingredients, 1975, CRC Press or Synthetic Food Adjuncts, 1947, by M. B. Jacobs, van Nostrand Co., Inc. Solvents and adjuvants of current use for the preparation of a flavoring formulation are also well known in the industry.

Further provided herein are flavors that are derived from or based on fruits where citric acid is the predominant, naturally-occurring acid include but are not limited to, for example, citrus fruits (e.g., lemon, lime), limonene, strawberry, orange, and pineapple. In one embodiment, the flavor is lemon, lime or orange juice extracted directly from the fruit. Further embodiments of the flavor comprise the juice or liquid extracted from oranges, lemons, grapefruits, limes, citrons, clementines, mandarins, tangerines, and any other citrus fruit, or variation or hybrid thereof. In a particular embodiment, the flavor comprises a liquid extracted or distilled from oranges, lemons, grapefruits, limes, citrons, clementines, mandarins, tangerines, any other citrus fruit or variation or hybrid thereof, pomegranates, kiwifruits, watermelons, apples, bananas, blueberries, melons, ginger, bell peppers, cucumbers, passion fruits, mangos, pears, tomatoes, and strawberries. Flavours that are derived from or based fruits where citric acid is the predominant, naturally-occurring acid include but are not limited to, for example, citrus fruits (e.g., lemon, lime), limonene, strawberry, orange, and pineapple. In one embodiment, the flavours food is lemon, lime or orange juice extracted directly from the fruit. Further embodiments of the flavour comprise the juice or liquid extracted from oranges, lemons, grapefruits, key limes, citrons, clementines, mandarins, tangerines, and any other citrus fruit, or variation or hybrid thereof. In a particular embodiment, the flavour comprises a liquid extracted or distilled from oranges, lemons, grapefruits, key limes, citrons, clementines, mandarins, tangerines, any other citrus fruit or variation or hybrid thereof, pomegranates, kiwifruits, watermelons, apples, bananas, blueberries, melons, ginger, bell peppers, cucumbers, passion fruits, mangos, pears, tomatoes, and strawberries.

The below examples are illustrative only and are not meant to limit the claims or embodiments described herein.

EXAMPLES

Example 1

Attempt to Make a Lemon Micro-Emulsion without Sugar by Increasing Propylene Glycol Amount and Temperature

TABLE 1

| Ingredient | % (weight) |
|---|---|
| Water phase | |
| H$_2$O | 50 |
| Propylene Glycol | 44.74 |
| SMP | 1.48 |
| | 96.22 |
| Oil Phase | |
| Lemon oil | 3.4 |
| Lecithin | 0.3 |
| butyl alcohol | 0.08 |
| | 3.78 |

Formulations were prepared generally as set forth in Table 1. Attempts were made to increase PG content from zero to almost 45% to see if micro-emulsion can be formed without fructose/glucose. SMP (sucrose monopalmitate) was dissolved into water at 45±3° C. in a beaker stirred by magnetic stirring bar. Oil phase was prepared by dissolving lecithin into lemon oil and butanol at room temperature in a different jar. Then the oil phase was poured into SMP solution while mixing at 45±3° C. by magnetic stirring bar. Cloudy macroemulsion was formed.

The above macroemulsion was then titrated with propylene glycol (PG) at 45±3° C. until 44.74 grams of PG was added to allow the weight of the whole mixture to be 100 g. The turbidity remained even after 44.74% of PG was added. So simply increasing the content of PG under the mild heating condition (45° C.) will not produce a clear microemulsion or nanoemulsion. The cloudy emulsion was then heated up. The turbidity lowered when the temperature was increased. It turned clear when the temperature was increased to 80° C. However, after the temperature returned to ambient, the turbidity increased and the sample was very cloudy. The experiment indicated that even though the transparent emulsion can be formed at high temperature, such as 80° C., in this case, it was not stable. At room temperature it turned back into cloudy macroemulsion, which was confirmed by droplet size distribution (PSD) measurement by way of dynamic light scattering (DLS) technology using a Malvern Zetasizer Nano S90. FIG. 1 shows that very large droplet sizes (>1 μm) of the emulsion were obtained at room temperature. In short, the mixture remained as a cloudy macroemulsion even when PG was increased to 45% at 45±3° C. The cloudiness of the micro-emulsion remained, and unsuccessful attempts to improve the clarity were made by increasing the temperature to as high as 80° C. This indicates that it would be very difficult to obtain a clear micro-emulsion without sugar.

Example 2

Micro-Emulsion Formation with Fructose and Glucose (1:1)

TABLE 2

| Ingredient | w/w % |
|---|---|
| Water Phase | |
| $H_2O$ | 27.04 |
| Glucose monohydrate | 20 |
| Fructose | 18 |
| PG | 29.7 |
| SMP | 1.48 |
| | 96.22 |
| Oil Phase | |
| Lemon Oil | 3.4 |
| lecithin | 0.3 |
| butyl alcohol | 0.08 |
| | 3.78 |

An oil in water emulsion was prepared with the ingredients as set forth in Table 2. SMP was dissolved into PG at 45±3° C. in a beaker stirred by magnetic stirring bar. The Oil phase was prepared by dissolving lecithin into lemon oil and butanol at room temperature in a second jar. The oil phase was then added into the PG solution of SMP while mixing at 45±3° C. by magnetic stirring bar, which resulted in cloudy macroemulsion. The resulted cloudy emulsion was then titrated at 45±3° C., while stirred with magnetic stirring bar, with invert sugar syrup, which was prepared in advanced by dissolving 90 grams of glucose monohydrate, 80 grams of fructose into 50 grams of water. After the addition of 48.24 grams of the syrup a clear micro-emulsion was formed. Water (16.8 g) was then added to make it 100 g in total. The micro-emulsion remained clear after it was cooled to room temperature. The resulted formulation was then repeated by adding glucose and fructose directly into the water phase. Clear micro-emulsions were formed in all repetitions.

Example 3

Increase Fructose/Glucose Concentration to Reduce Droplet Size

The amount of glucose and fructose was increased (from 36% in example 2 to 46% in example 3) to be close to the maximum solubility of glucose in a water-PG mixed solvent system near the refrigeration temperature (5° C.)—the ingredients are set forth in Table 3.

TABLE 3

| Ingredient | w/w % |
|---|---|
| Water Phase | |
| $H_2O$ | 14.84 |
| Glucose monohydrate | 26.6 |
| Fructose | 23.6 |
| PG | 29.7 |
| SMP | 1.48 |
| | 96.22 |
| Oil Phase | |
| Lemon Oil | 3.4 |
| lecithin | 0.3 |
| butyl alcohol | 0.08 |
| | 3.78 |

Figure 2:
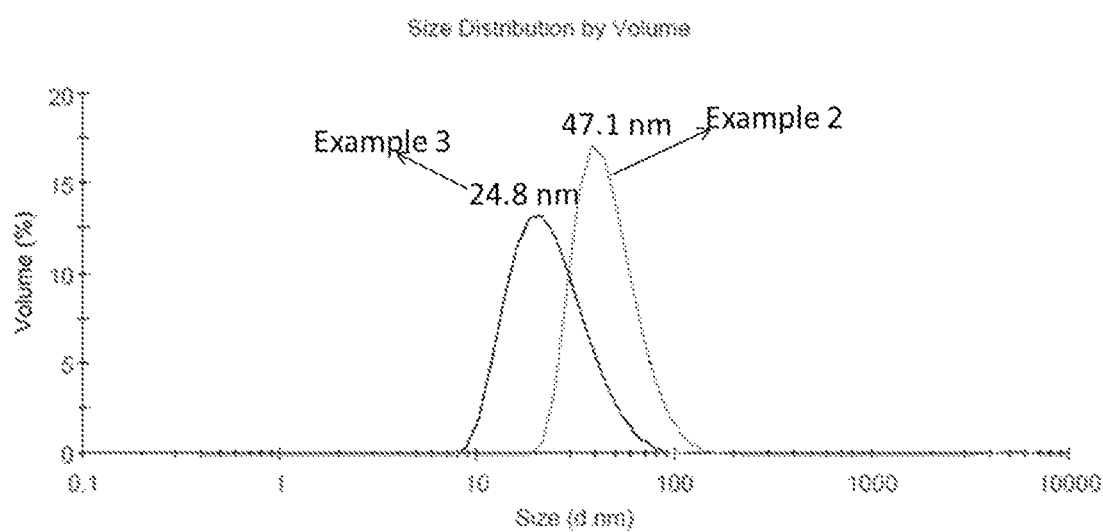
FIG. 2. Droplet size distribution diagram of the samples created from example 3 (46% invert sugar) and example 2 (36% invert sugar).

A clear micro-emulsion was again formed at 45±3° C. The droplet size distribution of the sample along with the sample obtained from example 2 was measured by way of dynamic light scattering (DLS) technology using a Malvern Zetasizer Nano S90. The micro-emulsion samples were diluted to 5% in deionized water. The droplet size decreased with the increased amount of glucose and fructose added (FIG. 2.). This demonstrates that an increase in the sugar concentration may result in oil in water emulsion with smaller droplet size. While not wishing to be bound to any theory, it is hypothesized that the sugar molecules play a role in lowering the kinetic energy barrier for micro-emulsion formation at much lower temperature (45° C. vs. 80° C.), and there is the minimum amount of sugar molecules needed to achieve the nano (d<200 nm) droplet size of a micro-emulsion.

Example 4

Lemon Oil Micro-Emulsion Formulation Facilitated by Fructose Only

Due to its much higher solubility fructose was chosen to prove the concept as a single sugar component in the formula. A formulation was prepared with the ingredients and amounts as set forth in Table 4.

TABLE 4

| Ingredient | w/w % |
|---|---|
| Water Phase | |
| $H_2O$ | 28.04 |
| Glucose monohydrate | 0 |
| Fructose | 37 |
| PG | 29.7 |
| SMP | 1.48 |
| | 96.22 |
| Oil Phase | |
| Lemon oil | 3.4 |
| PC100 | 0.3 |
| butyl alcohol | 0.08 |
| | 3.78 |

Figure 3:
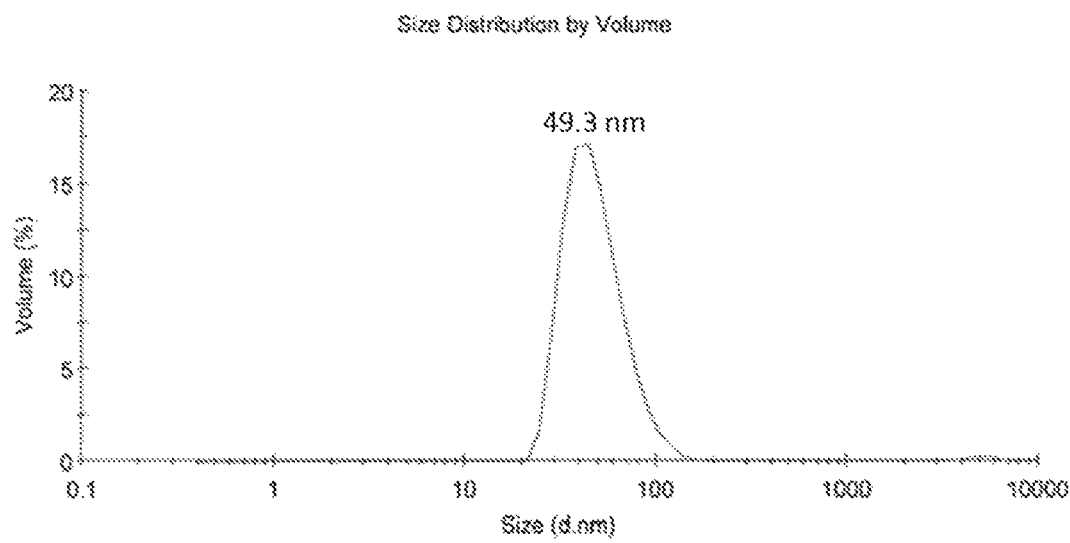
FIG. 3. Shows the droplet size of a formula of Example 4 having droplet size of around 50 nm as shown by DLS FIG. 4. Shows that a Droplet Size Distribution by DLS is between 40 to 50 nm for Formulas 5, 6, & 7 of Example 5 indicating the formation of micro-emulsions.

A clear micro-emulsion was again formed at 45±3° C. and droplet size distribution analysis by DLS was also confirmed and the result shown in FIG. 3.

Example 5

Formulation Using Sucrose and Sucrose-Fructose Mixture

Sucrose and its mixture with fructose were employed in the formulations even though there is a challenge of using sucrose due to its lower solubility in mixed water-PG solvent. The solubility in water-PG mixed solvent is: fructose>sucrose. Three experiments were done based on the following formulations shown in Table 5.

TABLE 5

| Ingredient | Formula 5 w/w % | Formula 6 w/w % | Formula 7 w/w % |
|---|---|---|---|
| Water Phase | | | |
| H$_2$O | 28.12 | 28.12 | 28.12 |
| sucrose | 37 | 32 | 1 |
| Fructose | 0 | 5 | 36 |
| PG | 29.7 | 29.7 | 29.7 |
| SMP | 1.48 | 1.48 | 1.48 |
| subtotal | 96.3 | 96.3 | 96.3 |
| Oil Phase | | | |
| Lemon oil | 3.4 | 3.4 | 3.4 |
| PC100 | 0.3 | 0.3 | 0.3 |
| subtotal | 3.7 | 3.7 | 3.7 |

Figure 4:
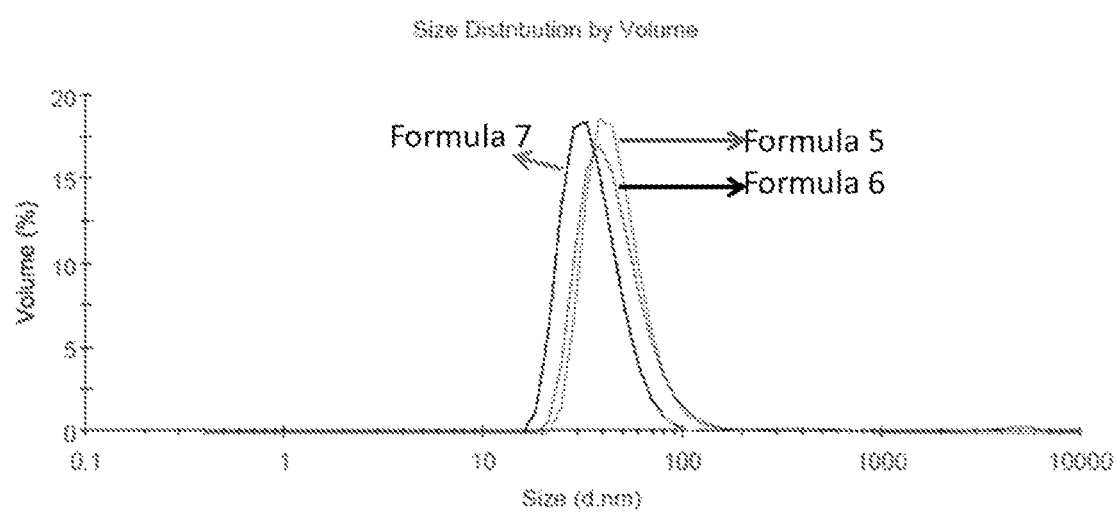

They all produced clear emulsions with a little difference in turbidity. The crystal clear micro-emulsion was obtained with Formula 7, which contains the highest amount of fructose. The formula 5, which contained sucrose only, produced a clear emulsion with very slight haziness which is due to a little bigger droplet size than formula 7 as shown in FIG. 4.

Example 6

Lime Micro-Emulsion Formulation Facilitated by Fructose and Glucose

The same formulation strategy was applied to obtain o/w micro-emulsion using Lime oil and the formula is shown below.

TABLE 6

| Ingredient | w/w % |
|---|---|
| Water Phase | |
| H$_2$O | 14.92 |
| Glucose monohydrate | 26.6 |
| Fructose | 23.6 |
| PG | 29.7 |
| SMP | 1.48 |
| | 96.30 |
| Oil Phase | |
| Lime | 3.4 |
| lecithin | 0.22 |
| butyl alcohol | 0.08 |
| | 3.70 |

Figure 5:
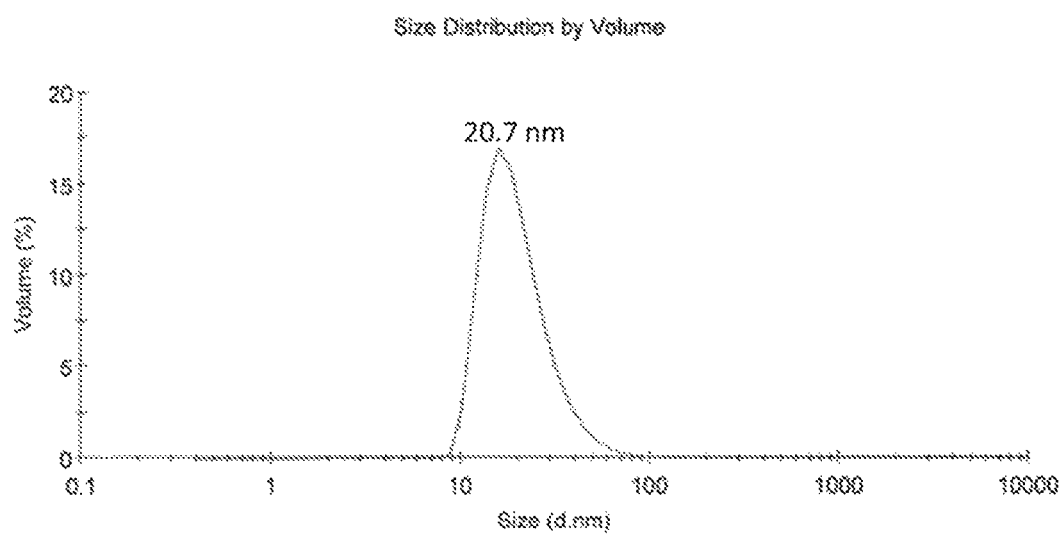
FIG. 5. Shows a Droplet size distribution using DLS technology by Malvern Zetasizer Nano S90 which confirms the formation of a stable Lime oil micro-emulsion facilitated by the addition of glucose and fructose.

A Clear Lime micro-emulsion was formed using a similar formulation at 45±3° C. and it was also confirmed by the droplet size measurement (FIG. 5.) whereby all droplet sizes are less than 100 nm.

Example 7

High Lemon Oil Concentration Micro-Emulsion Formulation Facilitated by Fructose and Glucose Mixture A dilutable, high oil concentration micro-emulsion is much harder to formulate if SOR<1. Here demonstrated is the o/w micro-emulsion of 20% lemon oil. And it further demonstrated its dilutability. A sample was prepared as set forth in Table 7. When the sample was diluted to 25% (4×), 10% (10×), 5% (20×) and 1% (100×), the droplet size remained constant.

TABLE 7

| Ingredient | w/w % |
|---|---|
| Water Phase | |
| H$_2$O | 16.7 |
| Glucose monohydrate | 9 |
| Fructose | 8 |
| PG | 22.5 |
| SMP | 9 |
| Glycerol | 12.5 |
| | 77.7 |
| Oil Phase | |
| Lemon | 20 |
| lecithin | 1.8 |
| butyl alcohol | 0.5 |
| | 22.3 |

Figure 6:
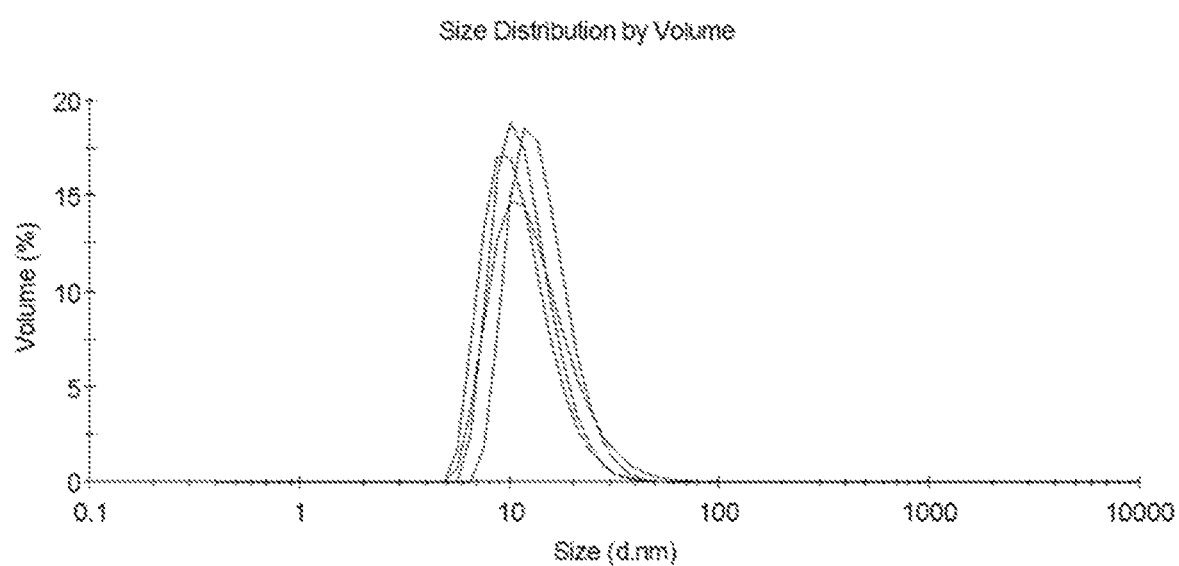
FIG. 6. Shows the droplet size distribution using DLS technology by Malvern Zetasizer Nano S90 on samples which were diluted to 25% (4×), 10% (10×), 5% (20×) and 1% (100×).

Droplet size was measured at different degree of dilution (FIG. 6). FIG. 6. Droplet size distribution using DLS technology by Malvern Zetasizer Nano S90 was measured on the samples which were diluted to 25% (4× dilution), 10% (10× dilution), 5% (20× dilution) and even as low as 1% (100× dilution). The results in FIG. 6 demonstrate consistent droplet size centered around 14 nm. It clearly indicated the formation of a stable dilutable micro-emulsion where all droplet sizes are less than 100 nm.

Example 8

Comparison of Current Micro-Emulsions to Formulations Described in US2010/0323066

A formulation with invert sugar syrup as described in Table 4 by US 2010/0323066 was made using the process as described in the claims herein. Lemon oil was used in place of the beta carotene in sunflower oil and lecithin (phosphatidyl choline) was used in place of the lysolecithin. A high shear force was not applied during the process of making the formulation nor was homogenization used to further process the emulsion. A phase separation immediately occurred after simple mixing and hence a micro-emulsion was not formed.

A formulation was prepared according to Table 5 US 2010/032066 using the process as described in the claims herein. lemon oil was used in place of Pasilla oil; lecithin was used in place of lysolecithin and inverted sugar (66%) was used in place of sorbitol. The formulation did not produce a clear micro-emulsion after simple mixing. Further, the resulting macroemulsion was not stable and phase separation occurred after overnight storage at room temperature. The sample prepared was a 100 g sample. To this sample was added an additional 24 g propylene glycol to give the following percentages: 1) 16% oil, 2) 1.6% lecithin, 3) 0.8% mixed tocopherol, 4) 6.5% SMP, 5) 23.2% PG, 6) 12% glycerol, 7) 26.4% inverted sugar, and 8) 13.6% water. The sample produced a clear emulsion after simple stirring. The final droplet size was less than 100 nm (down from greater than 1 μm).

Example 9

Further Samples were Prepared as Described Above with the Components Shown in Table 9

| Ingredients | Lemon w/w % | Lemon w/w % | Lime w/w % | Lime w/w % | Orange w/w % | Tangerine w/w % | Grapefruit w/w % |
|---|---|---|---|---|---|---|---|
| H2O | 16.7 | 17 | 16.4 | 13.5 | 17 | 13.5 | 10.7 |
| PG | 22.5 | 22.5 | 25 | 20 | 22.5 | 25 | 25 |
| Glu-H2O | | | | | | | |
| Fructose | 17 | 17 | 17 | 17 | 17 | 17 | 32.3 |
| SMP | 9 | 9 | 10 | 15 | 9 | 10 | 10 |
| Glycerol | 12.5 | 12.5 | 10 | 12.5 | 12.5 | 12.5 | |
| Flavor Oil | 20 | 20 | 20 | 20 | 20 | 20 | 20 |
| PC100 | 1.2 | 1.5 | 1.1 | 1.5 | 1.5 | 1.5 | 1.5 |
| PC25 | 0.6 | | | | | | |
| butanol | 0.5 | 0.5 | 0.5 | 0.5 | 0.5 | 0.5 | 0.5 |
| | 100 | 100 | 100 | 100 | 100 | 100 | 100 |

Example 10

A Sample was Prepared by the Method Described Above and the Ingredients and Amounts are Listed in Table 10

TABLE 10

| Ingredient | w/w % |
|---|---|
| H2O | 13.72 |
| Fructose | 41.2 |
| PG | 23.52 |
| SMP P90 | 1.48 |
| Glycerol | 16.3 |
| flavor oil | 3.4 |
| PC 100 | 0.25 |
| BuOH | 0.13 |

The invention claimed is:

1. An oil in water (o/w) micro-emulsion comprising:
   a. water;
   b. from 3% up to 30%, by weight oil, of the total weight of the emulsion;
   c. from 0.1% up to 10% of a lecithin;
   d. a sucrose monoester as an emulsifier wherein the ratio, by weight, of the combined amount of the lecithin and sucrose monoester to the oil is less than 1;
   e. propylene glycol wherein the propylene glycol to water ratio by weight is greater than 1:1; and
   f. from 14% up to 40%, by weight, of a sugar selected from the group consisting of fructose, glucose, sucrose, and combinations thereof, by total weight of the emulsion;
   wherein the mean droplet size of the o/w micro-emulsion is about 10 to about 80 nm.

2. The emulsion as recited in claim 1 further comprising from 0.1% up to 20% by weight glycerin of the total weight of the emulsion.

3. The emulsion as recited in claim 2 comprising from 10% up to 20%, by weight, glycerin of the total weight of the emulsion.

4. The emulsion as recited in claim 1, further comprising from 0.08% up to 1%, by weight, of the total weight of the emulsion, a $C_{2-6}$ alcohol soluble alcohol.

5. The emulsion as recited in claim 4 further comprising 0.1-0.5% of a soluble $C_{2-6}$ alcohol.

6. The emulsion as recited in claim 5 wherein the alcohol is selected from the group consisting of ethanol, a propanol and a butanol.

7. The emulsion as recited in claim 6 wherein the butanol is selected from the group consisting of n-butanol, sec-butanol, isobutanol and tert butanol.

8. The emulsion as recited in claim 1, wherein the droplet size is 10 to 80 nm.

9. The emulsion as recited in claim 8 wherein droplet size is 10 to 50 nm.

10. The emulsion as recited in claim 1, wherein the emulsion is provided in the substantial absence of sucrose.

11. A beverage comprising from 0.002% to 0.1% of the emulsion as defined in claim 1.

12. A process for making an oil/water (o/w) emulsion comprising:
   a. mixing a sucrose monoester into propylene glycol at temperature of 40° C. up to 70° C. to form a sucrose monoester solution;
   b. mixing water and sugar into the sucrose monoester solution;
   c. dissolving a lecithin into the oil to form an oil phase, wherein the ratio of the combined amount, of sucrose monoester and the lecithin, to oil is less than 1; and
   d. mixing the oil phase into the sucrose monoester solution to form a clear micro-emulsion,
   wherein the micro-emulsion is formed without a homogenization step.

13. An oil in water (o/w) micro-emulsion comprising:
   a. 10.7 to 17% water;
   b. 20% by weight oil, of the total weight of the emulsion;
   c. 1.5% to 1.8% of a lecithin;
   d. 9% to 15% of a sucrose monoester as an emulsifier;
   e. 20 to 25% propylene glycol;
   f. 17% fructose;
   g. 10% to 12.5% glycerin; and
   h. 0.5% butanol,
   wherein the mean droplet size of the o/w micro-emulsion is from 10 to 80 nm.

14. The emulsion as recited in claim 1, wherein the sugar selected from the group consisting of fructose, glucose, sucrose, and combinations thereof is from 17% up to 40% by total weight of the emulsion.

* * * * *